A. R. SMITH.
AIRPLANE.
APPLICATION FILED DEC. 19, 1918.

1,346,472.

Patented July 13, 1920.
3 SHEETS—SHEET 1.

Inventor
Arthur R. Smith,
By H. Ralph Burton,
Attorney

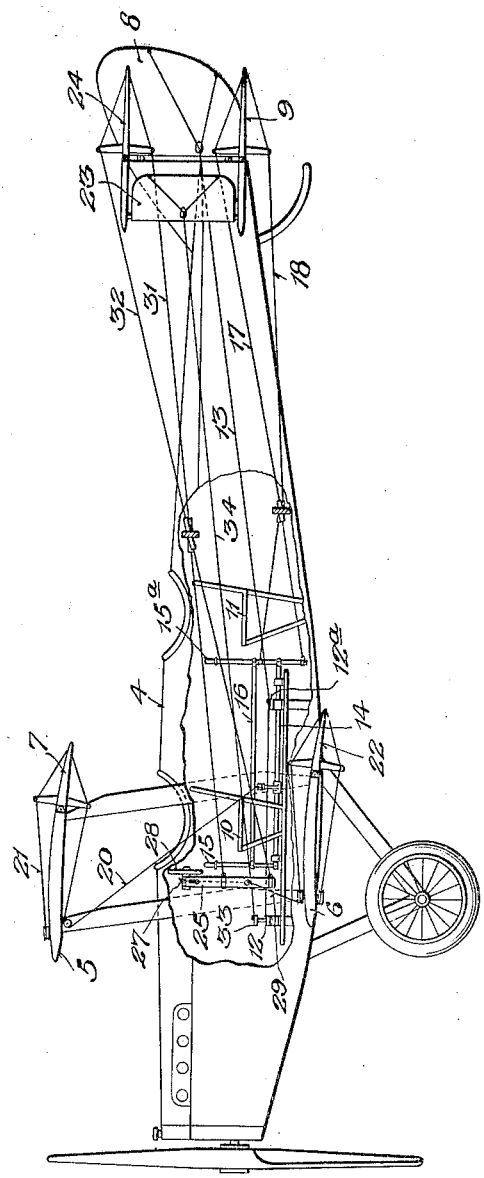

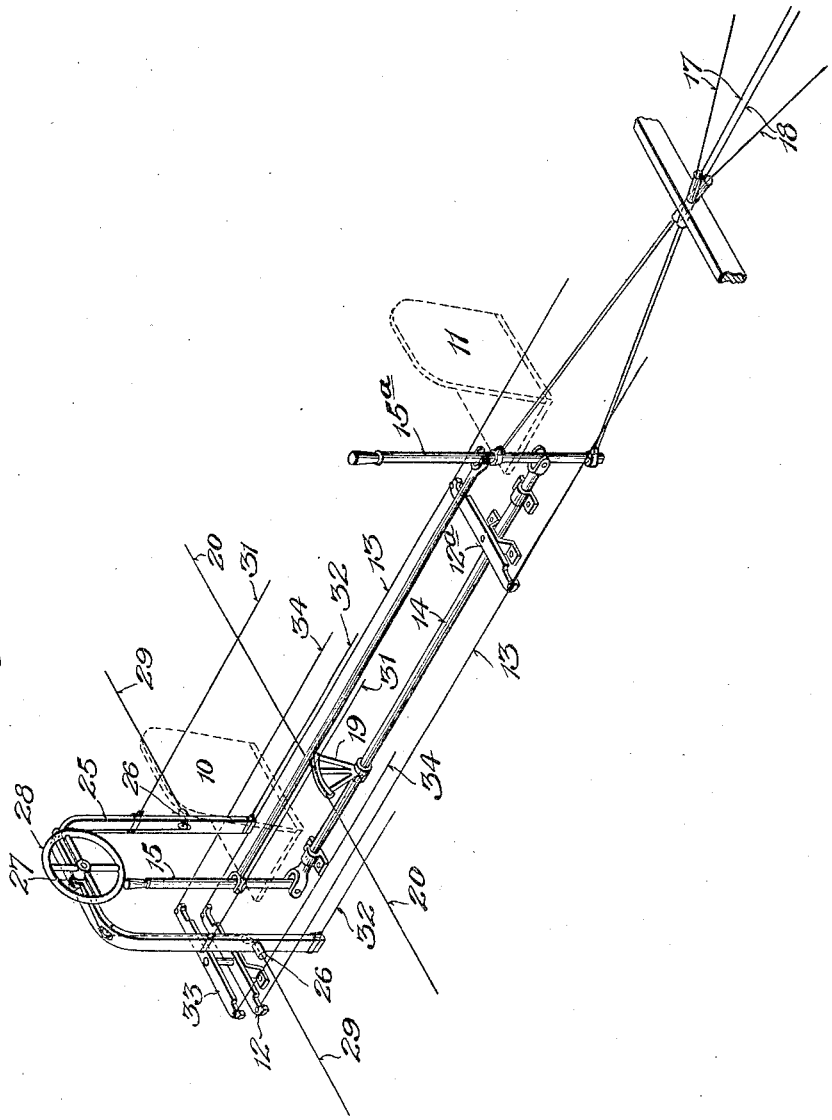

UNITED STATES PATENT OFFICE.

ARTHUR R. SMITH, OF FORT WAYNE, INDIANA.

AIRPLANE.

1,346,472.　　　　Specification of Letters Patent.　　Patented July 13, 1920.

Application filed December 19, 1918. Serial No. 267,505.

*To all whom it may concern:*

Be it known that I, ARTHUR R. SMITH, a citizen of the United States, residing at Fort Wayne, in the county of Allen and State of Indiana, have invented certain new and useful Improvements in Airplanes, of which the following is a specification, reference being had therein to the accompanying drawings.

This invention relates particularly to airplanes used in instructing and training student aviators.

Airplanes commonly used for this purpose are equipped with dual control means, which includes levers or other operating members in front of the instructor's seat and similar members in front of the student's, and these members are so associated that when one set moves a like movement is made in the other.

While instruction is being carried on with the dual control system, the controls are turned over to the student after he has acquired some knowledge of flying, the instructor simply releasing his hold on his operating members after signaling the student that he intends to do so. The student then flies the machine as best he can, and corrections are made by the instructor, as the necessity for them occurs, by manipulation of the control members in front of him. This is confusing to the student, as he may not recognize that the machine had tipped and is at a loss to know whether it was the instructor or uneven air currents that caused the control members in front of him to move.

It is an object of the invention to provide means whereby occurrences of this kind in an airplane, which are liable to be confusing to the student, are avoided, and this is accomplished by equipping the machine with an extra set of ailerons, elevating-flaps, and rudders connected with an extra set of operating members in the instructor's cockpit. These parts are entirely independent of the usual dual control means with which training-machines ordinarily are equipped, and their movement does not cause movement in or impose effort on the dual control means other than what results from alteration in the course of flight.

With a machine thus equipped with an extra set of controls, the instructor takes the student into the air as usual. After reaching the desired altitude, the instructor flies the machine by using the extra control. This leaves the dual system of control entirely free, and the student can begin using it by moving the operating members slightly and noting the effect this movement has upon the stability of the machine. By repeating such movements the student soon acquires a "feel" of the controls and learns something of the result of a certain amount of movement of any of the controls. While the student is getting this knowledge, the instructor, of course, is correcting all the tipping, dipping, or turning caused by the student's control movements or by the action of uneven air currents in which they are flying.

As soon as the student acquires some of this "feel" and knowledge, he is told to correct a certain tip, or dip, or turn the machine may make. Then the instructor, by operating the extra control, will cause the machine to make this dip or tip or turn and watch the student correct it, and the process may be repeated until the student succeeds in making correction properly. They then will advance to a greater degree of the same movement or to some new one, repeating always until the student is familiar with it.

In this way, the student will be taken through a complete set of dips, tips, and turns, flying both straight away or in turns. The instructor will use his extra control and watch the action of his own set of dual control members, the movement of which will indicate the exact movement and quickness of response the student gives to his control to correct tipping or dipping or turning of the machine, and thus the instructor is able more accurately to point out and correct any mistakes the student may make.

With a machine equipped as contemplated by this invention, the student never feels anything through the operating members in front of him except what is natural and what he always is apt to feel in the flights he is to make in the future. As the student advances, the instructor, through his extra control, will exaggerate a slightly tipped condition of the machine, rather than correct it, and in this manner he will bring it forcibly to the attention of the student and compel him to correct it to prevent the upsetting of the machine. The instructor can force the machine into all positions that are considered dangerous, and then leave it for the student to correct. All the time the machine will be acting for the student just as though the air or a weakening motor was bringing on the perilous position. He will be going through experiences that are identical with those he is apt to meet when flying alone. The student will not be sent out to fly alone until he has proved to the instructor that he can control the machine and bring it to correct flying position even though it has been tipped into dangerous positions.

Moreover, the instructor, by means of the operating members of the dual control system in front of him, may operate the ailerons, elevating-flaps, and rudder of that system, when necessary, to rescue the machine from a perilous position in the event the student does not act quickly enough or at a time when the student may be rigidly holding his controls in a position that would cause the machine to turn over or drop.

When read in connection with the description herein, the details of construction and arrangement of parts contemplated by the invention will be apparent from the accompanying drawings, forming part hereof, wherein an embodiment of the invention is exemplified, for purposes of illustration.

While the disclosures herein now are considered to exemplify a preferable embodiment of the invention, it is to be understood that it is not the intention to be limited necessarily thereto in interpretation of the claims, as modifications and adaptations within the limits of the claims can be made without departing from the nature and spirit of the invention.

Like reference-characters refer to corresponding parts in the views of the drawings, in which certain structural details not pertaining to the invention are omitted, and of which—

Fig. 2 is a side elevation, the side of the fuselage being broken away; and

Fig. 3 is a perspective view of the controls.

Figure 1:
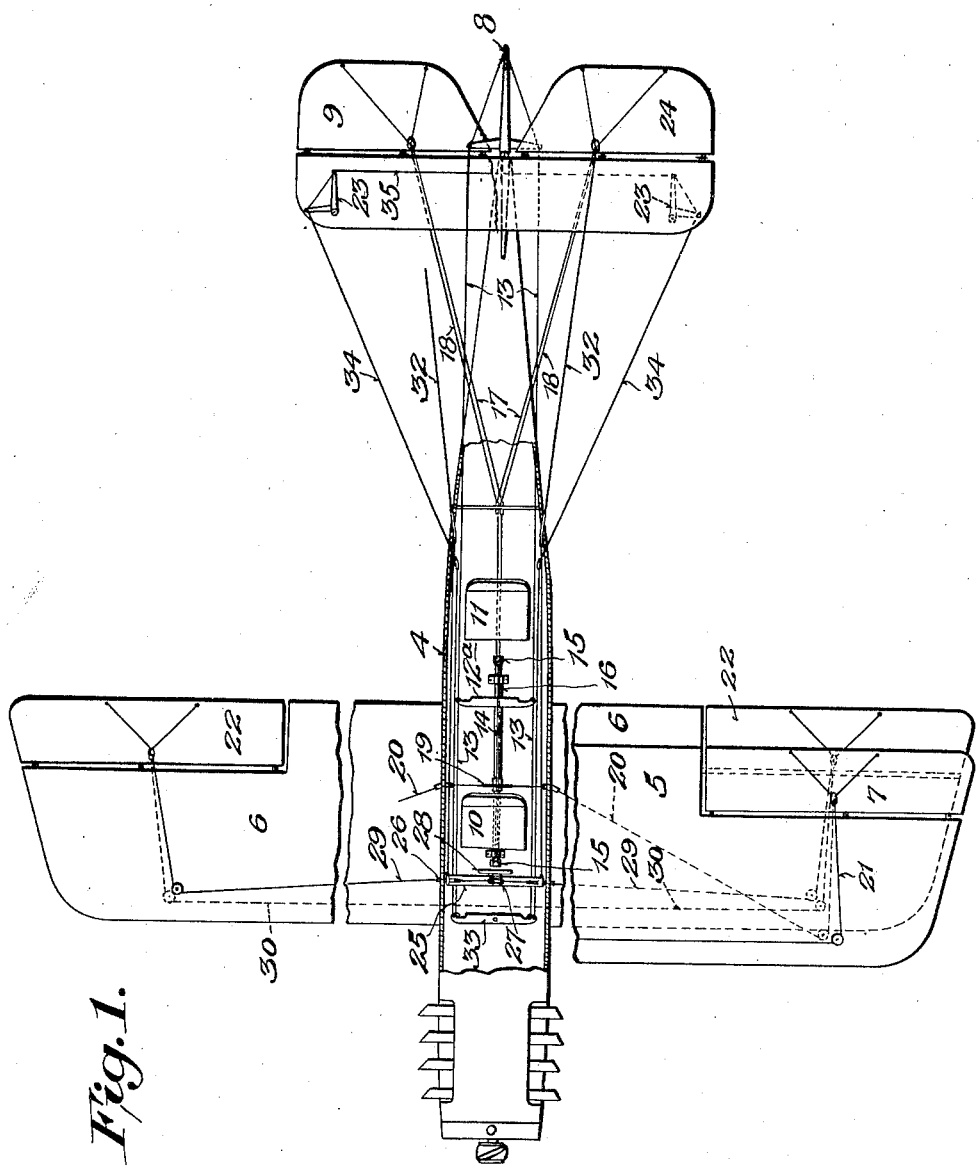
Figure 1 is a plan view, certain parts being broken away.

Having more particular reference to the drawings, 4 designates the fuselage, 5 the upper sustention-plane, 6 the lower sustention-plane, 7 ailerons on the upper plane, 8 the rudder, and 9 elevation-flaps, such as commonly found in airplanes.

In machines used for instructing and training student aviators, two seats, usually located one behind the other, are located in the fuselage, such as shown in the drawings and designated by 10 and 11, respectively, the instructor ordinarily occupying the front seat and the student the rear; and dual control means are provided, which includes a set of aileron, rudder, and elevation-flap operating members in front of each seat, so that either the instructor or student may operate the controls, and the two sets are so associated that when any member of one set is moved a corresponding movement is imparted to the corresponding member of the other set.

An example of such a dual control system is disclosed by the drawings. It includes a substantially horizontal pivotally-mounted rudder-bar 12 in front of the instructor's seat and a similar bar 12$^a$ in front of the student's, and wires 13, one on each side, are connected to these bars and to the rudder 8, the arrangement being such that, when either of the bars is swung, the rudder is swung toward the side on which forward movement of the bars occurs and the airplane is caused to turn toward that side.

The control system also includes a rock-shaft 14 extending longitudinally and mounted in the lower part of the fuselage. A lever 15 in front of the instructor's seat and a lever 15$^a$ in front of the student's are so pivotally mounted on the shaft 14 that they may have fore and aft movement without moving the shaft, and they are so connected to the shaft that it is rocked when either lever is moved toward one side or the other. The fore and aft movement given to one lever is imparted to the other by a rod 16 connected to the levers.

The rear lever 15$^a$ extends below its pivotal connection with the rock-shaft 14. A wire 17 connected to the lever below the pivotal point extends in two branches of which one is connected to the upper portion of each elevation-flap 9, and a wire 18 connected to the lever at equidistance above the pivotal point similarly extends in two branches of which one is connected to the lower portion of each flap, the arrangement being such that, when the upper portion of the lever is moved forwardly, the flaps are pulled downwardly, and, when it is moved rearwardly, the flaps are pulled upwardly.

For the purpose of controlling the ailerons 7, a segmental or other suitable member 19 is fast on and extends upwardly from the rock-shaft 14, and wires 20 are secured to and lead laterally from this member through suitable guides to the lower portions of the ailerons, and a wire 21 correspondingly secured to the upper portions of the ailerons leads from one to the other through suitable guides, the arrangement being such that, when the shaft 14 is rocked by movement of one of the levers 15 or 15$^a$ to one side or the other, the aileron on the side toward which movement is made is pulled upwardly and the other pulled downwardly.

The system thus described as including the rock-shaft and levers or sticks is what is known in the art as the "stick" control; and the set of operating members consisting of a rudder-bar and lever in front of each seat permits either occupant of the machine to control it, as hereinbefore explained.

In order to enable the instructor, for the purposes hereinbefore explained, to fly the machine without direct operation of the normal control system, the machine is equipped with ailerons 22 on the lower sustention-plane, an extra rudder 23 in each side portion of the tail, extra elevation-flaps 24 in the upper portion of the tail, and with extra operating members for these parts located in front of the instructor's seat, all the instrumentalities of this extra control system being distinct from and operable independently of the normal or usual control system.

For operation of the extra ailerons and elevation-flaps, the "Dep." type of control is shown as an example of a suitable form. This includes a substantially U-shaped frame 25. The frame is mounted in its lower portion on journals 26, and from a winding drum 27 rotated by a hand-wheel 28 in the upper portion of the frame control-wires 29 lead through the journals and through suitable guides to the upper portions of the extra ailerons 22. A wire 30, correspondingly secured to the lower portions of those ailerons, leads from one to the other through suitable guides. The arrangement is such that, when the hand-wheel is turned one aileron will be pulled upwardly and the other downwardly. Wires 31 extending to the lower portions of the extra elevation-flaps 24 are connected to the frame 25 above the pivotal point, and wires 32 extending to the upper portions of those flaps are connected to the frame below the pivotal point, so that the flaps will be operated when the frame is swung in a fore and aft direction.

An extra rudder-bar 33 is connected pivotally above the instructor's normal or usual rudder-bar 12, and wires 34 connected to the end portions of the extra bar lead to the outside of the extra rudders 23. These rudders are connected by a cross-wire 35 so that, when one rudder is pulled toward the outside by one of the wires 34, the other rudder will be pulled inwardly.

Having thus described my invention, what I claim as new, and desire to secure by Letters Patent, is—

1. In an airplane having places for two occupants, the combination of a set of ailerons, rudder, and elevation-flap and dual control means therefor, and independently of and operable separately from said parts an extra set of ailerons, rudder, and elevation-flap and control means connected therewith in front of the place of one occupant.

2. In an airplane having places for two occupants, the combination of a set of ailerons, rudder, and elevation-flap and dual control means therefor, and independently of and operable separately from said parts extra ailerons and control means connected therewith in front of the place of one occupant.

3. In an airplane having places for two occupants, the combination of a set of ailerons, rudder, and elevation flap and dual control means therefor, and independently of and operable separately from said parts an extra rudder and control means connected therewith in front of the place of one occupant.

4. In an airplane having places for two occupants, the combination of a set of ailerons, rudder, and elevation-flap and dual control means therefor, and independently of and operable separately from said parts an extra elevation-flap and control means connected therewith in front of the place of one occupant.

5. In an airplane having places for two occupants, normal means for maintaining the stability of the airplane in flight including two connected uniformly acting operating members one adjacent to the place of each occupant, and independently of and operable separately from said means instrumentalities arranged to cause the airplane to tip, dip, and turn and to restore it to normal condition of flight, and control means adjacent to the place of one occupant connected with said instrumentalities.

In witness whereof, I have affixed my signature.

ARTHUR R. SMITH.